United States Patent [19]
Melkoumian

[11] Patent Number: 5,652,390
[45] Date of Patent: Jul. 29, 1997

[54] METHOD AND DEVICE FOR AUTONOMOUS MEASUREMENT OF AN IRREGULAR MOVEMENT BASED ON RESONATORY SENSOR

[76] Inventor: Baghrat V. Melkoumian, 555 E. El Camino Real, Apt. #111, Sunnyvale, Calif. 94087

[21] Appl. No.: 568,815

[22] Filed: Dec. 7, 1995

[51] Int. Cl.$^6$ ................................. G01B 9/02
[52] U.S. Cl. ................................. 73/657; 356/351
[58] Field of Search ................... 73/655, 514.26, 73/514.27, 514.19, 653, 657; 250/227.14, 227.17; 356/358, 350, 351

[56] References Cited

U.S. PATENT DOCUMENTS

| | | | |
|---|---|---|---|
| 3,770,352 | 11/1973 | White | 356/133 |
| 4,408,495 | 10/1983 | Couch et al. | 73/655 |
| 4,422,167 | 12/1983 | Shajenko | 73/655 |
| 4,534,222 | 8/1985 | Finch et al. | 73/653 |
| 4,768,381 | 9/1988 | Sugimoto | 73/657 |
| 4,830,495 | 5/1989 | SooHoo et al. | 356/350 |
| 4,848,871 | 7/1989 | Seidel et al. | 73/655 |
| 4,900,918 | 2/1990 | Killian | 250/227 |
| 4,900,919 | 2/1990 | Twerdochlib | 250/227 |
| 4,905,519 | 3/1990 | Makowski | 73/657 |
| 4,922,095 | 5/1990 | Gergely | 250/227.17 |
| 5,153,677 | 10/1992 | Keck et al. | 356/358 |
| 5,297,436 | 3/1994 | Chan | 73/657 |

Primary Examiner—Hezron E. Williams
Assistant Examiner—Richard A. Moller

[57] ABSTRACT

The method and the device for autonomous measurement of a movement are implemented based on a resonator with a coherent radiation. There is measuring of the interference signal of the extracted non-identical components of the radiation of the resonator. The resonator, the systems for the extracting and the coupling of these components and a receiver of the radiation are disposed motionless each other.

This method based on the new physical effect. The effect consists in the altering of the polarization of the coherent radiation in a resonator due to the movement of the resonator with reference to an inertial system.

The measurement of the movement is possible due to the phase modulation of each of the non-identical components of the radiation that takes place when the resonator is moving. This modulation is the result of the additional complex component of the phase of the standing wave that induces during the movement of the resonator.

There is the moving interference pattern that appears on the receiver during the movement. The signal of the intensity of this interference pattern is defined by the acceleration of the movement of the Autonomous Resonatory Sensor and by its geometry.

The implementation of the ARS shows measuring resolution better than 0,001 m/sec$^2$.

5 Claims, 4 Drawing Sheets

METHOD AND DEVICE FOR AUTONOMOUS MEASUREMENT OF AN IRREGULAR MOVEMENT BASED ON RESONATORY SENSOR

BACKGROUND OF THE INVENTION

The invention relates to a movement measurement with reference to an inertial system. Specifically it relates to measurements in which the movement of an object is measured by using a laser or other radiation beams generated from a resonator with an output.

FIG. 1 is a schematic view showing conventional vibrometer using a laser beam, the extracting system, the coupling system and the receiver for measuring difference signal of the radiation beams (laser beams).

In FIG. 1, an optical vibrometer according to the U.S. Pat. No. 4,768,381 (Sep. 6, 1988) comprises a reflecting member 11 having a conical concave reflective surface 12 disposed on an object 3 to be measured, a light source 1 for generating light 4 to irradiate the reflective surface 12 of the reflecting member 11, a vibration measuring means 2, which comprises a beam splitter and a coupling system, disposed between the light source 1 and the reflective surface 12 of the reflecting member 11 for measuring the three dimensional vibration of the object 3 based on the light 4 generated by the light source 1 and the light 5 reflected from the reflective surface 12 of the reflecting member 11.

In the above-mentioned vibrometer, as in the all Doppler-effect based devices, however, there is not provided the autonomous measurement of an irregular movement of an object, when measurement means are fully disposed on the object.

This results in decreasing of both measurement accuracy and cost efficiency.

FIG. 2 is a schematic view showing an another conventional vibrometer with the polarizing elements on the optical fiber to measure an ultrasonic vibration of the substance.

In FIG. 2, an optical fiber ultrasonic sensor according to the U.S. Pat. No. 5,297,436 (Mar. 29, 1994) comprises a laser source 1 and a quarter wave plate 2 through that the output from the laser is directed to provide a circularly polarized beam.

The laser source can be a gas laser or laser diode providing a linearly polarized output.

The output from quarter wave plate 2 is directed to an input end 3 of a polarization maintaining fibre 4 of the substantially known type.

Fiber 4 includes a substantially straight sensing portion 5 that is exposed to the incident ultrasonic wave to be measured schematically shown at 6. Sensing portion 5 is mounted by the suitable known means illustrated at 7 so that the fast principal axis of the fiber is aligned with the propagation direction of the ultrasonic wave to achieve maximum induced phase difference.

Light from output end 8 of fiber 4 are directed to a beam splitter 9. One beam passes through the linear polarizer 10 with its principal axis rotationally displaced at 45° to the principal axes of the fiber and the intensity of the transmitted beam is detected by the photodetector 11. The intensity of the other beam from the beam splitter 9 is detected by the photodetector 12. Photodetectors 11 and 12 can be of any suitable type for example a PIN photodiode or an avalanche photodiode followed by an electronic amplifier.

The output signals from each of photodetectors 11 and 12 are directed to a signal processor 13 which in turn generates a suitable driving signal for a display unit 14. The display unit can, for example, be an oscilloscope, spectrum analyzer or computer.

However, the above-mentioned optical fiber ultrasonic sensor comprises added sensitive elements and materials, and there is not provided an autonomous measurement.

As mentioned above, in both of conventional devices there are moving and motionless parts, added elements and materials. This results in decreasing of both measurement accuracy and cost efficiency.

SUMMARY OF THE INVENTION

The purpose of the present invention is to implement the method and the devices to measure an autonomous movement of an object.

To achieve the above purpose, according to the present invention, there is implemented the method of measurement including:

a generation of a coherent radiation from a resonator;

an extraction of the non-identical by complex phases components of the radiation from the resonator;

a coupling of the non-identical components of the radiation for the interference;

a detection of the signal of the interference from the coupling system by a receiver.

To achieve the autonomous movement measurement there are implemented devices, wherein the resonator, the extracting system, the coupling system and the receiver are disposed motionless with reference to each other on an object to be measured.

This method based on the new physical effect.

The effect consists in the altering of the polarization of the coherent radiation in a resonator due to the movement of the resonator with the reference to an inertial system.

Therefore, it is not necessary to use moving parts of the sensor and added elements and materials.

This results in increasing of both accuracy and cost efficiency of the measurement.

Other Advantages

An Autonomous Resonatory Sensor (ARS) is basically different from a classical pendulum accelerometer because of the ARS does not measure the gravity acceleration without motion.

The ARS has not any dead zone and hysteresis on output characteristics.

Some Application Examples

The ARS can measures the acceleration of an autonomous movement of an object with reference to an inertial system in autonomous navigation systems.

The cost efficient implementation of the ARS based on the semiconductor laser can be used as the point sensor in the prosthetic appliance certification and control systems, the testing and feed-back control systems of robots, tools and toys, the air- and hydrodynamic tasks for meteorology, the speaker certification systems.

DETAILED DESCRIPTION OF THE INVENTION

Figure 1:
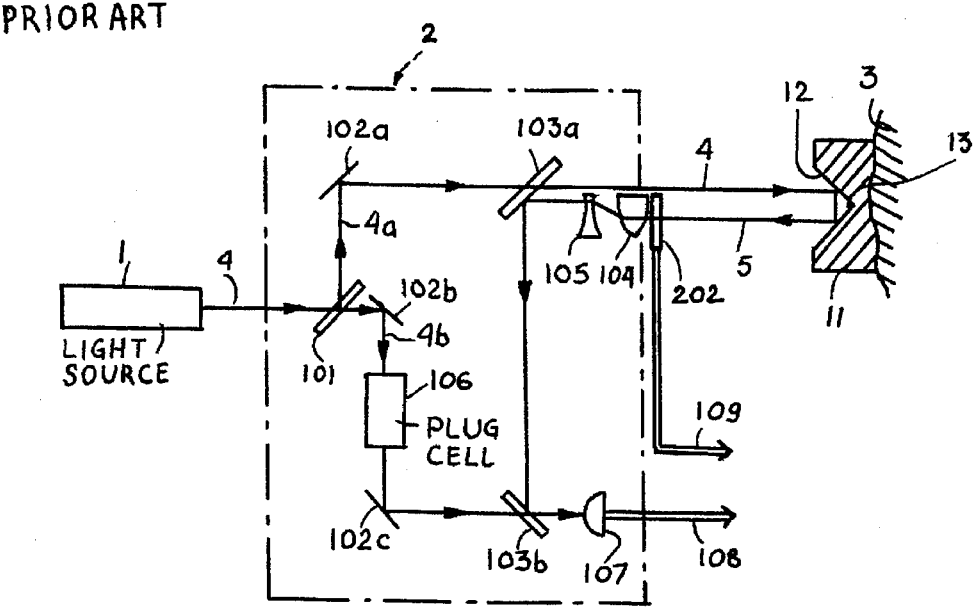
FIG. 1 is schematic view showing the conventional vibrometer according to the U.S. Pat. No. 4,768,381.
Figure 2:
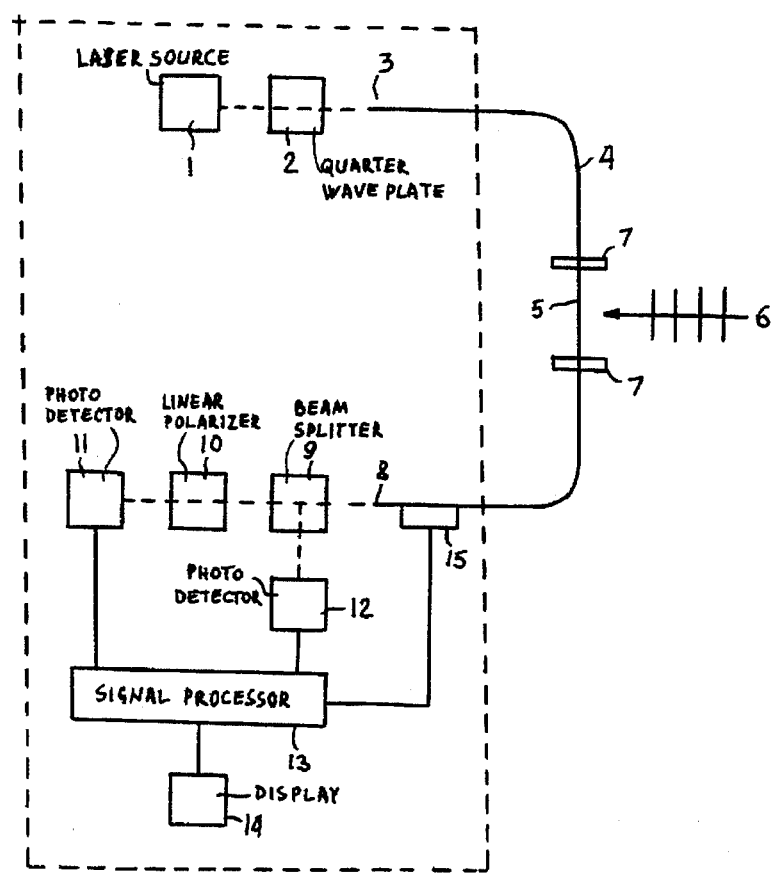
FIG. 2 is schematic view showing the conventional sensor according to the U.S. Pat. No. 5,297,436.

The method for an autonomous measurement of the movement according to the present invention consists in the using of the standing wave of the coherent radiation in the resonator as the sensitive element of the accelerated movement measurement.

The devices based on the present invention have not any moving or vibrating parts, flexible fibers or liquid media inside.

The output signal of the devices based on the present invention is proportional to an acceleration of the movement with reference to an inertial system and is independent of the gravity.

The invented method based on the new physical effect that was discovered, measured and interpreted by author for the linear laser resonators.

The effect consists in the altering of the polarization of the coherent radiation in a resonator due to the movement of the resonator with reference to an inertial system.

The resonator in the preferred embodiment can be any single mode operating linear laser resonator with the light standing wave.

The using of the wave processes and particularly the standing wave as the sensitive element of the accelerated movement measurement is known in mechanics. It is based on the elastics and inertial properties of materials.

The present invention will be more fully understood considering some cases of the influence of the movement on the wave processes in mechanics.

However, the elastics and inertial properties of the sensitive elements of these mechanical devices cause hysteresises on output characteristics as well as measurement errors induced by gravity.

These cases are for illustration only and cannot be chosen as the prototypes of the present invention.
Sound Wave Examples The movement of the fire-brigade vehicle may be detected by the altering of the tone of the fire alarm disposed on the vehicle.

The tone altering is measured in this case by the receiver disposed motionless on the way of the vehicle.

This is the Doppler effect case where the source and the receiver are moving with reference to each other.

Doppler effect is performed also when the source and the receiver are motionless with reference to each other. The measurement of the movement in that case can be provided by an additional element of measurement system disposed on the moving object such as the reflecting member in the first prototype.

The movement of the object may be detected by the measuring means disposed motionless with reference to each other. In this case an additional element of measurement system can be performed as a liquid or gas media.

This method based on alteration of some parameters of the media (for example, density) caused by the forced movement due to its specific properties (for example, inertia).

This case is close to the second prototype wherein the intermediate fiber acts as the liquid media between the source of radiation and the receiver due to its specific optical property (light birefringence in tensioned fiber). The birefringence is induced due to the tension of the fiber by the ultrasonic waves.

The generation of the standing wave in the liquid media increases the measurement accuracy of the last method.

The movement of the device leads to the alteration of the vibration phase of the liquid due to the its inertia.
String Accelerometer Example For the precision measurement of an acceleration of the object the standing wave is performed by an elastic vibration of a string disposed in the resonator along the direction of the movement.

There are the source and the receiver of the string vibration disposed on opposite sides of the resonator.

The receiver detects the phase shifting of the standing wave in the resonator.

The phase zeros are disposed along the resonator axis on its opposite sides and on every integer number of halves of the wavelength of the elastic standing wave.

To increase precise accuracy of the measurement of the movement there are means to provide the standing wave in single plane with fixed resonant frequency of the "string accelerometer".

The screwing of the elastic wave in the "string accelerometer" is considered as the measurement error.

There is nothing that prevents the existence of the screwing wave in the "string accelerometer" without the special means.

The screwing elastic wave exists due to the flexibility of the string in a plane perpendicular to the direction of the movement. The phase altering of the screwing wave defined by the acceleration component non-parallel to the string. So there is a chance to use this phase altering of the screwing wave as a measurement signal.

Lets assume that one can fixs the string in the points where there are the phase zeros of the standing wave. Then one can obtain only screwing wave. If one would implement also a device for measurement of the phase of the screwing wave it will be the accelerometer without hysteresis on output characteristics. This device will be a mechanical analog for the present invention.
Theoretical interpretation of the invention The theoretical interpretation of the present invention is based on principles of classical quantum mechanics and quantum electronics.

The accelerated movement of the resonator induces the additional complex phase of the standing wave of the radiation. This complex phase is defined by the accelerated shifting of the resonator and by its geometry. An induced complex gradient of the phase is directed contrary to the shifting vector.

The standing wave of the radiation has the constant phase points in the resonator. There are zeros of the phase of the standing wave on every integer number of halves of its wavelength on the axis of the resonator and on the outputs of the resonator.

The disposition of the zero points of the standing wave is independent of the accelerated movement.

At the same time there are not any conditions to prevent the existence of a circular polarization of the light in the resonator.

It is well known, that any standing wave can be presented as the sum of the running waves propagating in the opposite directions along the axis of the resonator.

If the resonator is motionless, the running waves are different only by directions of the propagation.

According to the present invention the running waves during the movement irradiate from the extracting system with different induced polarization conditions.

An additional complex phase of the standing wave leads to the alteration of the polarization conditions of the two running waves. These waves are getting the circular like type of the polarization conditions.

The comparing or measuring of the conditions of the polarization of the two running waves can be implemented, according to the present invention, by any extracting, coupling and receiving systems corresponding to the type of the induced polarization.

The coupling system of the preferred embodiment includes the reflecting and splitter elements disposed motionless to the resonator. The extracting system includes the polarization transformer or the polarization filter of the radiation disposed motionless to the resonator.

The pattern of the interference of the coupled running waves in the devices based on the present invention is defined by the extracting and coupling systems and by the geometry of the resonator.

A time derivative of the intensity of the interference pattern on the receiver input is proportional to the acceleration of the resonator movement in real time.

Usually it is not available to observe or to measure a condition of the circular polarization of the light in real time because of its rapid altering with light frequency.

On the contrary, it is possible by the devices based on the present invention because of the slow modulated alterations of the polarization of the radiation with an accelerated shifting of the resonator.

Observation and measurement of the effect

It has been observed and measured the characteristics of all mentioned devices based on the present invention as in FIG. 3–8.

The measurements are performed on the heavy testing equipment with large heavy vibrating part to avoid of the moving and vibrations inside the ARS.

The results of measurements showed that an output signal of an ARS is proportional to the amplitude of the acceleration of the vibration of the testing equipment.

There was used also the large rotating equipment for the testing of all mentioned devices by constant rotating with the central running acceleration up to 4 g.

The results of the measurements showed that indeed output signal of the ARS is independent of the regular rotation with mentioned central running acceleration.

It appears only with starting or finishing movement.

At the same time an ARS can measure a small irregularity of the real kinetic movement.

The implementation of the sensors shows measuring resolution better than 0,001 m/sec$^2$.

DESCRIPTION OF THE PREFERRED EMBODIMENTS

Figure 3:
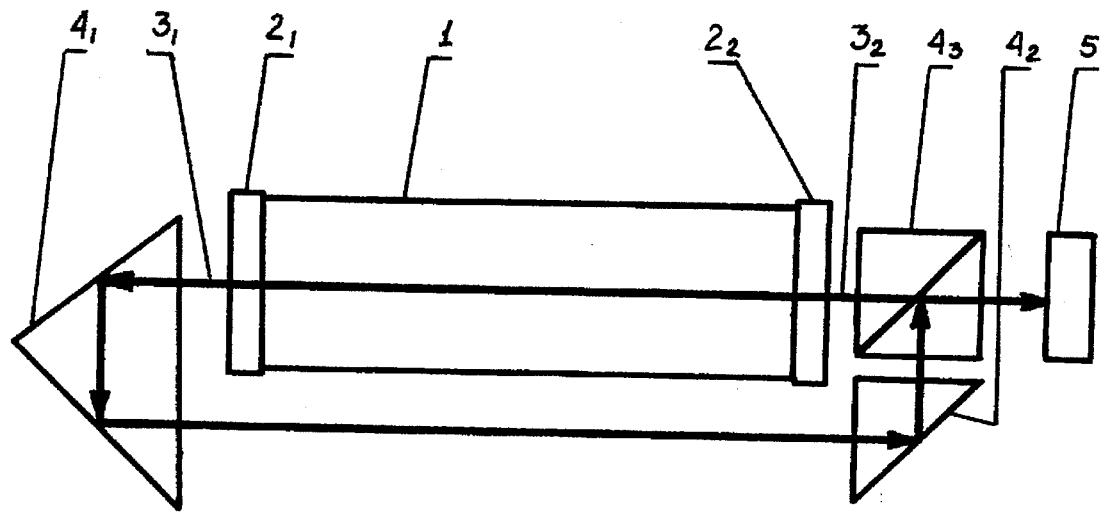
FIG. 3 is schematic view showing the ARS according to the first embodiment of this invention.

In FIG. 3 the resonator 1 is performed as the single mode operating helium-neon laser resonator with two outputs $2_1$ and $2_2$ as an extracting system to launch the co- and contra-movement propagating laser beams $3_1$ and $3_2$.

The coupling system includes motionless each other and to resonator 1 turn prisms $4_1$, $4_2$ and the splitter prism $4_3$.

The receiver 5 is disposed on the output of the coupling system and motionless to the resonator 1 to measure the interference signal of the coupled beams.

Figure 4:
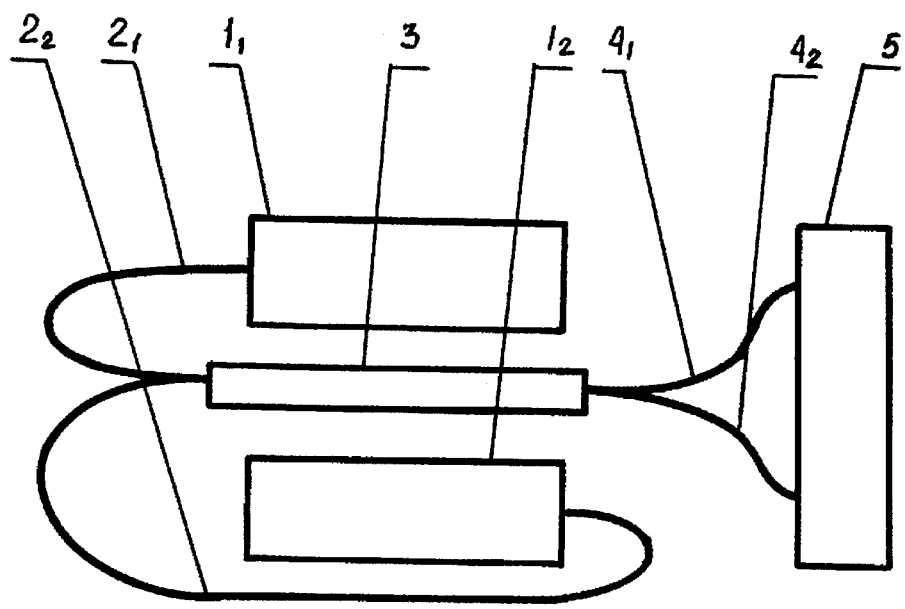
FIG. 4 is schematic view showing the ARS with the two motionless each other linear laser resonators each with single output and the fiber optics coupling system.

In FIG. 4 the ARS includes two semiconductor lasers $1_1$, $1_2$, with opposite directed outputs to launch the laser beams into the enters of single mode fibers $2_1$, $2_2$.

The extracting and the coupling systems include motionless each other and to the resonator 1 enter fibers $2_1$, $2_2$, the beam splitter 3 and exit fibers $4_1$, $4_2$.

The receiver 5 is disposed on the output of the coupling system and motionless to lasers $1_1$, $1_2$ to measure the interference signal of the coupled beams.

Figure 5:
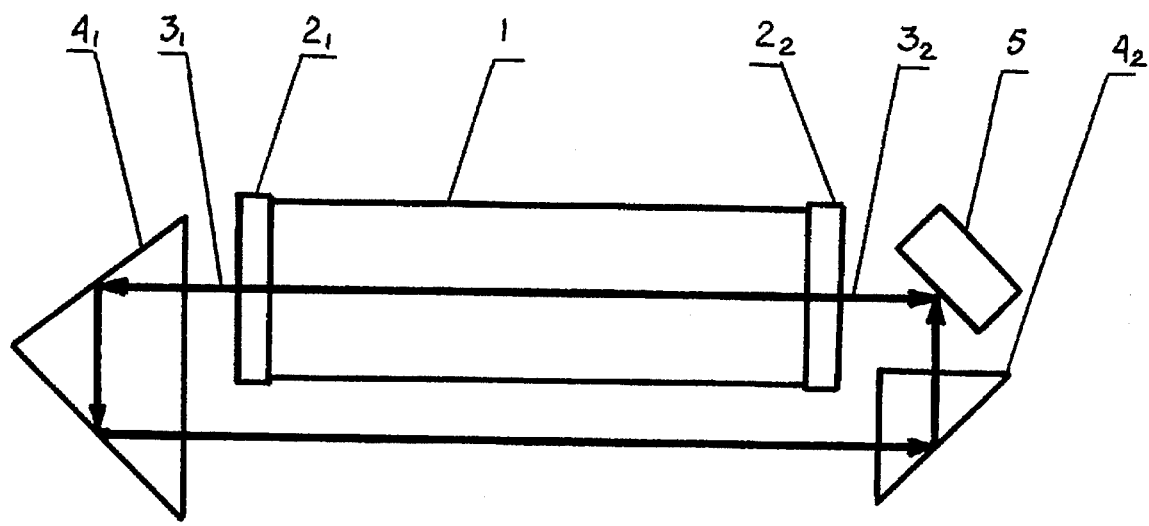
FIG. 5 is schematic view showing the ARS with the decreased temperature altering sensitivity using the discrete optics coupling system.

In FIG. 5, as in FIG. 3, the resonator 1 is performed as the single mode operating resonator with two outputs $2_1$, $2_2$ as an extracting system to launch the co- and contra-movement propagating laser beams $3_1$, $3_2$.

The coupling system includes motionless each other and to the resonator 1 turn prisms $4_1$ and $4_2$.

The laser beam $3_1$ after the coupling system and the laser beam $3_2$ direct on the input of the receiver 5 with angle's 45°.

The receiver 5 is disposed on the output of the coupling system and motionless to the resonator 1 to measure the interference signal of the coupled beams.

Figure 6:
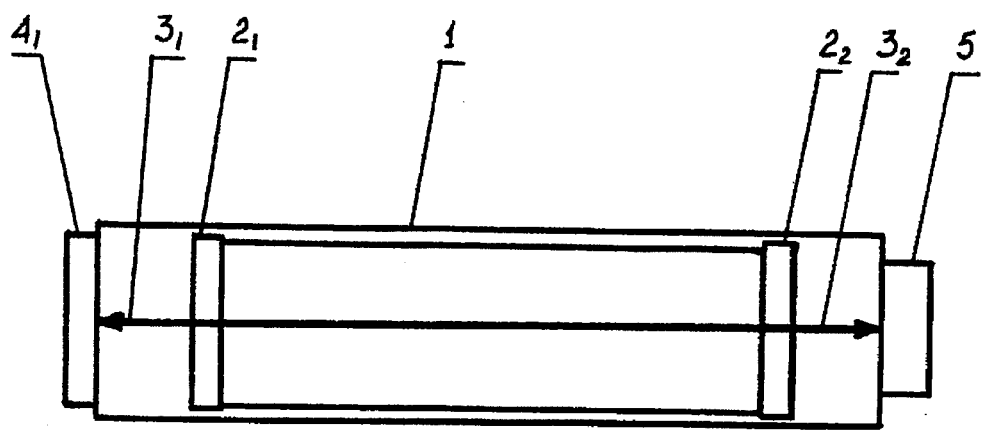
FIG. 6 is schematic view showing the ARS with the best temperature and acceleration sensitivity.

In FIG. 6, as in FIG. 3 and FIG. 5 the resonator 1 is performed as the single mode operating helium-neon laser resonator with two outputs $2_1$ and $2_2$ as an extracting system to launch the co- and contra-movement propagating laser beams $3_1$ and $3_2$.

The coupling system includes single laser mirror $4_1$ conventionally disposed in front of the output $2_1$ and motionless to the resonator 1.

The receiver 5 is disposed behind the output $2_2$ and motionless to the resonator 1 to measure interference signal of the coupled beams.

Figure 7:
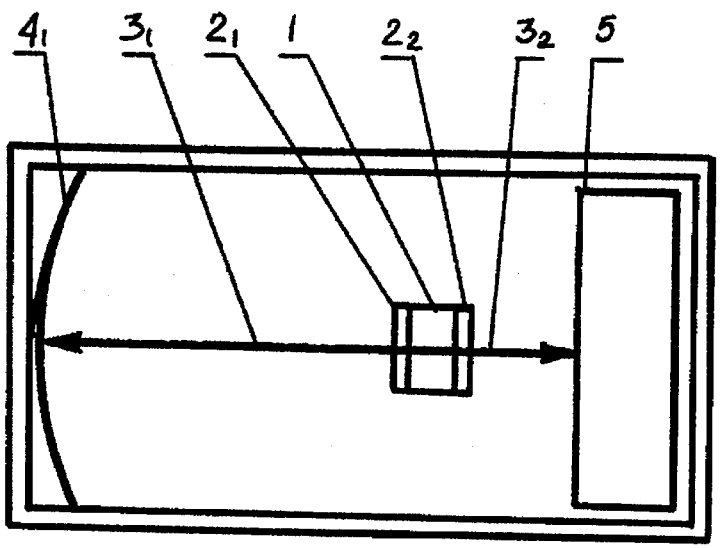
FIG. 7 is schematic view showing the ARS with the best sensitivity based on the semiconductor laser.

In FIG. 7 the resonator 1 is performed as the single mode operating semiconductor laser resonator with two outputs $2_1$, $2_2$ as an extracting system to launch the laser beams $3_1$, $3_2$.

The coupling system includes single laser mirror $4_1$ conventionally disposed in front of the output $2_1$ and motionless to the resonator 1.

The receiver 5 is disposed on the output of coupling system, behind the output $2_2$ and motionless to the resonator 1.

Figure 8:
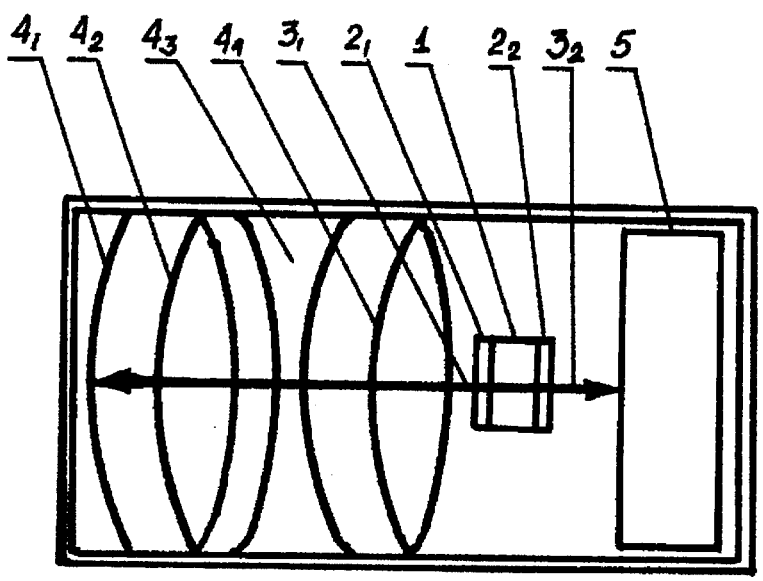
FIG. 8 is schematic view showing the semiconductor ARS with the decreased temperature sensitivity.

In FIG. 8 as in FIG. 7 the resonator 1 is performed based on the single mode operating semiconductor laser resonator with two outputs $2_2$ and $2_2$ as an extracting system to launch the laser beams $3_1$ and $3_2$.

The coupling system includes the motionless to the resonator 1 laser mirror $4_1$ conventionally disposed in front of the output $2_2$ and, in addition to FIG. 7, the beam forming lenses, $4_2$, $4_3$, $4_4$.

In FIG. 3–8 the receiver 5 is disposed on the output of coupling system and motionless to the resonator 1 to measure the interference signal of coupled laser beams.

I claim:

1. A method for autonomously measuring the irregular movement of an object with respect to an inertial system, comprising the steps of:

disposing a resonator of coherent radiation with two outputs, an extracting means, a coupling means and a detecting means on the said object, fixing the said resonator of coherent radiation, said extracting means, said coupling means and said detecting means with respect to the said object, such that no movement of either the said resonator of coherent radiation, said extracting means, said coupling means and said detecting means can occur with respect to the said object, fixing the said resonator of coherent radiation, said extracting means, said coupling means and said detecting means with respect to each other such that no movement of the said resonator of coherent radiation, said extracting means, said coupling means and said detecting means can occur with respect to each other, placing and fixing the said extracting means on the said two outputs of the said resonator of the coherent radiation such that no movement of the said extracting means can occur with respect to the said resonator, generating a beam of coherent radiation in the said resonator and along the axis of the said resonator wherein the said beam of coherent radiation consists of at least one standing wave with constant phase points in the said resonator and zero phase points of the said standing wave occur on every integer number of halves of the wavelength of the standing wave and on the outputs of the said resonator, extracting co-movement propagating components and contra-movement propagating components of the said at least one standing wave from the said resonator of coherent radiation by the said extracting means wherein the said components have different induced polarizations from changes in the complex phases due to an accelerated movement of the said object and due to the accelerated movement of the said resonator and from the geometry of the said resonator of coherent radiation, coupling said components for interference and detection by the said coupling means, detecting an intensity signal of the said interference of said components by said detecting means, wherein the time derivative of the said intensity signal is proportional to the accelerated movement of the said object and the resonator in real time.

2. A resonatory sensor for autonomously measuring the irregular movement of an object with respect to an inertial system, comprising:

a resonator of coherent radiation with two outputs, extracting means, coupling means and detecting means, wherein the said resonator of coherent radiation, extracting means, coupling means and detecting means are fixed to the said object such that no movement of either of the said resonator of coherent radiation, said extracting means, said coupling means and said detecting means can occur with respect to the said object, wherein the said resonator of coherent radiation, extracting means, coupling means and detecting means are fixed to the said object such that no movement of either of the said resonator of coherent radiation, said extracting means, said coupling means and said detecting means can occur with respect to each other, wherein the said extracting means are placed and fixed with respect to the said two outputs of the said resonator of the coherent radiation such that no movement of the said extracting means can occur with respect to the said resonator, wherein the resonator of coherent radiation generates a beam of coherent radiation along the axis of the said resonator wherein the said beam of coherent radiation consists of at least one standing wave with constant phase points in the said resonator and zero phase points of the said standing wave occur on every integer number of halves of the wavelength of the standing wave and on the outputs of the said resonator, wherein the said at least one standing wave from the said resonator of coherent radiation has components with different induced polarizations from changes in the complex phases due to an accelerated movement of the said object and due to the accelerated movement of the said resonator and from the geometry of the said resonator of coherent radiation, wherein the said extracting means extracts co-movement propagating components of the said beam of coherent radiation from one of the said two outputs of the said resonator and said extracting means extracts contra-movement propagating components of the said beam of coherent radiation from the other of the said two outputs of the said resonator, wherein the said coupling means couples said components to said detecting means for detection, wherein the said detecting means receives the said components from the said coupling means and detects an intensity signal of an interference of the said components, wherein the time derivative of the said intensity signal is proportional to the accelerated movement of the said object and the resonator in real time.

3. A resonatory sensor for autonomously measuring the irregular movement of an object with respect to an inertial system, as set forth in claim 2, wherein said resonator of coherent radiation is a laser resonator.

4. A resonatory sensor for autonomously measuring the irregular movement of an object with respect to an inertial system, as set forth in claim 2, wherein said extracting means and said coupling means includes reflecting and splitting elements for said beam of coherent radiation.

5. A resonatory sensor for autonomously measuring the irregular movement of an object with respect to an inertial system, as set forth in claim 2, wherein said extracting means and said coupling means includes a polarization transformer or polarization filter for said beam of coherent radiation.

* * * * *